(12) United States Patent  (10) Patent No.: US 12,532,356 B2
Liang et al.  (45) Date of Patent: Jan. 20, 2026

(54) METHODS, DEVICES AND COMPUTER READABLE MEDIA FOR COMMUNICATION ON UNLICENSED BAND

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 830 days.

(21) Appl. No.: 17/776,834

(22) PCT Filed: Nov. 15, 2019

(86) PCT No.: PCT/CN2019/118953
§ 371 (c)(1),
(2) Date: May 13, 2022

(87) PCT Pub. No.: WO2021/092951
PCT Pub. Date: May 20, 2021

(65) Prior Publication Data
US 2022/0408486 A1  Dec. 22, 2022

(51) Int. Cl.
*H04W 74/0816* (2024.01)
*H04L 5/00* (2006.01)
(Continued)

(52) U.S. Cl.
CPC ....... *H04W 74/0816* (2013.01); *H04L 5/0055* (2013.01); *H04L 27/2646* (2013.01); *H04W 72/0453* (2013.01)

(58) Field of Classification Search
CPC .......... H04W 74/0816; H04W 72/0453; H04L 5/0055
See application file for complete search history.

(56) References Cited

U.S. PATENT DOCUMENTS 10,200,992 B2 * 2/2019 Dinan .................... H04W 16/14
10,390,260 B2 * 8/2019 Liu ...................... H04L 27/2613
(Continued)

FOREIGN PATENT DOCUMENTS

CN  108174445 A  6/2018
CN  108271430 A  7/2018
(Continued)

OTHER PUBLICATIONS

Ericsson, "R1-1913178—Introduction to NR-based Access to Unlicensed Spectrum", Nov. 11, 2019, 3GPP TSG-RAN WG1 meeting #99, pp. (Year: 2019).*
(Continued)

*Primary Examiner* — Redentor Pasia
(74) *Attorney, Agent, or Firm* — Sughrue Mion, PLLC

(57) ABSTRACT

Embodiments of the present disclosure relate to methods, devices and computer readable media for communication on unlicensed band. In example embodiments, a method includes determining, at a terminal device, a time interval preceding a start symbol for uplink transmission. The method further includes determining, based on a first signal generating operation for the start symbol, a second signal generating operation for the time interval. The method further includes transmitting, to a network device over the time interval, a signal generated based on the second signal generating operation.

16 Claims, 9 Drawing Sheets

(51) Int. Cl.
*H04L 27/26* (2006.01)
*H04W 72/0453* (2023.01)

(56) References Cited

U.S. PATENT DOCUMENTS

| | | | |
|---|---|---|---|
| 2016/0337224 A1* | 11/2016 | Afkhami | H04B 17/318 |
| 2019/0037411 A1* | 1/2019 | Wu | H04W 16/14 |
| 2020/0177328 A1* | 6/2020 | Guo | H04W 72/0446 |
| 2021/0007083 A1* | 1/2021 | Yoon | H04L 27/26536 |
| 2021/0250986 A1* | 8/2021 | Luo | H04L 27/26025 |
| 2022/0159712 A1* | 5/2022 | Myung | H04W 16/14 |
| 2022/0394762 A1* | 12/2022 | Bhattad | H04W 74/0808 |

FOREIGN PATENT DOCUMENTS

| | | |
|---|---|---|
| CN | 109479321 A | 3/2019 |
| CN | 109842477 A | 6/2019 |
| EP | 3 541 133 A1 | 9/2019 |
| JP | 2022-521433 A | 4/2022 |
| WO | 2016/141994 A1 | 9/2016 |
| WO | 2019/216620 A1 | 11/2019 |

OTHER PUBLICATIONS

Office Action issued Apr. 18, 2023 in Japanese Application No. 2022-528021.
Ericsson, "Introduction of NR-based access to unlicensed spectrum", 3GPP TSG-RAN WG1 Meeting #99, R1-1913630, Nov. 18-22, 2019, Reno, NV (60 pages total).
NEC, "Remaining issues on CP extension", 3GPP TSG RAN WG1 #100-e, R1-2000767, Feb. 24-Mar. 6, 2020, e-Meeting (5 pages total).
Ericsson, "Introduction of NR-based access to unlicensed spectrum", 3GPP TSG-RAN WG1 Meeting #99, R1-1913178, Nov. 18-22, 2019, Reno, NV (5 pages total).
3rd Generation Partnership Project; Technical Specification Group Radio Access Network; NR; Physical layer procedures for data (Release 15), 3GPP TS 38.214 V15.7.0, Sep. 2019 (13 pages total).
Office Action issued Apr. 27, 2023 in Chinese Application No. 201980103437.9.
LG Electronics, "HARQ procedure for NR-U", 3GPP TSG RAN WG1 #97, R1-1906677, May 13-17, 2019, pp. 1-17, Reno, USA.
International Search Report of PCT/CN2019/118953 dated Aug. 18, 2020 [PCT/ISA/210].
Written Opinion of PCT/CN2019/118953 dated Aug. 18, 2020 [PCT/ISA/237].
"Enhancements to configured grants for NR-unlicensed", Intel Corporation, 3GPP TSG RAN WG1 Meeting #99, R1-1912200, Nov. 2019, 14 pages.
"Coexistence and channel access for NR unlicensed band operations", Huawei, HiSilicon, 3GPP TSG RAN WG1 Meeting #99, R1-1911866, Nov. 2019, 18 pages.
"Remaining details on PUSCH structure for LAA UL", Sharp, 3GPP TSG RAN WG1 Meeting #86, R1-167606, Aug. 2016, 2 pages.
Extended European Search Report issued Oct. 18, 2022, in European Application No. 19952762.3.
Office Action issued Oct. 21, 2022, in Indian Application No. 202217032269.

* cited by examiner

METHODS, DEVICES AND COMPUTER READABLE MEDIA FOR COMMUNICATION ON UNLICENSED BAND

CROSS REFERENCE TO RELATED APPLICATIONS

This application is a National Stage of International Application No. PCT/CN2019/118953, filed Nov. 15, 2019.

TECHNICAL FIELD

Embodiments of the present disclosure generally relate to the field of communication, and in particular, to methods, devices and computer readable media for communication on unlicensed band.

BACKGROUND

Communication technologies have been developed in various communication standards to provide a common protocol that enables different wireless devices to communicate on a municipal, national, regional, and even global level. An example of an emerging communication standard is new radio (NR), for example, 5G radio access. NR is a set of enhancements to the Long Term Evolution (LTE) mobile standard promulgated by Third Generation Partnership Project (3GPP). Aspects regarding communication on unlicensed band in NR system have been discussed but there are still some remaining issues needed to be addressed.

SUMMARY

In general, example embodiments of the present disclosure provide methods, devices and computer readable media for communication on unlicensed band.

In a first aspect, there is provided a method for communication. The method comprises determining, at a terminal device, a time interval preceding a start symbol for uplink transmission; determining, based on a first signal generating operation for the start symbol, a second signal generating operation for the time interval; and transmitting, to a network device over the time interval, a signal generated based on the second signal generating operation.

In a second aspect, there is provided a method for communication. The method comprises determining, at a network device, a time interval preceding a start symbol for uplink transmission from a terminal device; and receiving, from the terminal device over the time interval, a signal generated based on a second signal generating operation for the time interval, and wherein the second signal generating operation is determined based on a first signal generating operation for the start symbol.

In a third aspect, there is provided a method for communication. The method comprises determining, at a terminal device, first feedback information concerning reception of data on a first group of shared channels between the terminal device and a network device; determining second feedback information concerning reception of data on a second group of shared channels between the terminal device and the network device, the second group of shared channels different from the first group of shared channels; generating uplink control information for the first group by appending the first feedback information after the second feedback information; and transmitting the uplink control information to the network device.

In a fourth aspect, there is provided a method for communication. The method comprises receiving, at a network device from a terminal device, uplink control information for a first group of shared channels between the network device and the terminal device; and determining, based on the uplink control information, first feedback information concerning reception of data on the first group of shared channels and second feedback information concerning reception of data on a second group of shared channels between the network device and the terminal device, and wherein the second group of shared channels are different from the first group of shared channels, and the first feedback information is appended after the second feedback information in the uplink control information.

In a fifth aspect, there is provided a terminal device. The terminal device comprises a processor and a memory. The memory is coupled to the processor and stores instructions thereon. The instructions, when executed by the processor, cause the terminal device to perform acts comprising determining a time interval preceding a start symbol for uplink transmission; determining, based on a first signal generating operation for the start symbol, a second signal generating operation for the time interval; and transmitting, to a network device over the time interval, a signal generated based on the second signal generating operation.

In a sixth aspect, there is provided a network device. The network device comprises a processor and a memory. The memory is coupled to the processor and stores instructions thereon. The instructions, when executed by the processor, cause the network device to perform acts comprising determining, at a network device, a time interval preceding a start symbol for uplink transmission from a terminal device; and receiving, from the terminal device over the time interval, a signal generated based on a second signal generating operation for the time interval, and wherein the second signal generating operation is determined based on a first signal generating operation for the start symbol.

In a seventh aspect, there is provided a terminal device. The terminal device comprises a processor and a memory. The memory is coupled to the processor and stores instructions thereon. The instructions, when executed by the processor, cause the terminal device to perform acts comprising determining first feedback information concerning reception of data on a first group of shared channels between the terminal device and a network device; determining second feedback information concerning reception of data on a second group of shared channels between the terminal device and the network device, the second group of shared channels different from the first group of shared channels; generating uplink control information for the first group by appending the first feedback information after the second feedback information; and transmitting the uplink control information to the network device.

In an eighth aspect, there is provided a network device. The network device comprises a processor and a memory. The memory is coupled to the processor and stores instructions thereon. The instructions, when executed by the processor, cause the network device to perform acts comprising receiving, from a terminal device, uplink control information for a first group of shared channels between the network device and the terminal device; and determining, based on the uplink control information, first feedback information concerning reception of data on the first group of shared channels and second feedback information concerning reception of data on a second group of shared channels between the network device and the terminal device, and wherein the second group of shared channels are different from the first group of shared channels, and the first feedback information is appended after the second feedback information in the uplink control information.

In a ninth aspect, there is provided a computer readable medium having instructions stored thereon. The instructions, when executed on at least one processor, cause the at least one processor to perform the method according to the first aspect of the present disclosure.

In a tenth aspect, there is provided a computer readable medium having instructions stored thereon. The instructions, when executed on at least one processor, cause the at least one processor to perform the method according to the second aspect of the present disclosure.

In an eleventh aspect, there is provided a computer readable medium having instructions stored thereon. The instructions, when executed on at least one processor, cause the at least one processor to perform the method according to the third aspect of the present disclosure.

In a twelfth aspect, there is provided a computer readable medium having instructions stored thereon. The instructions, when executed on at least one processor, cause the at least one processor to perform the method according to the fourth aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
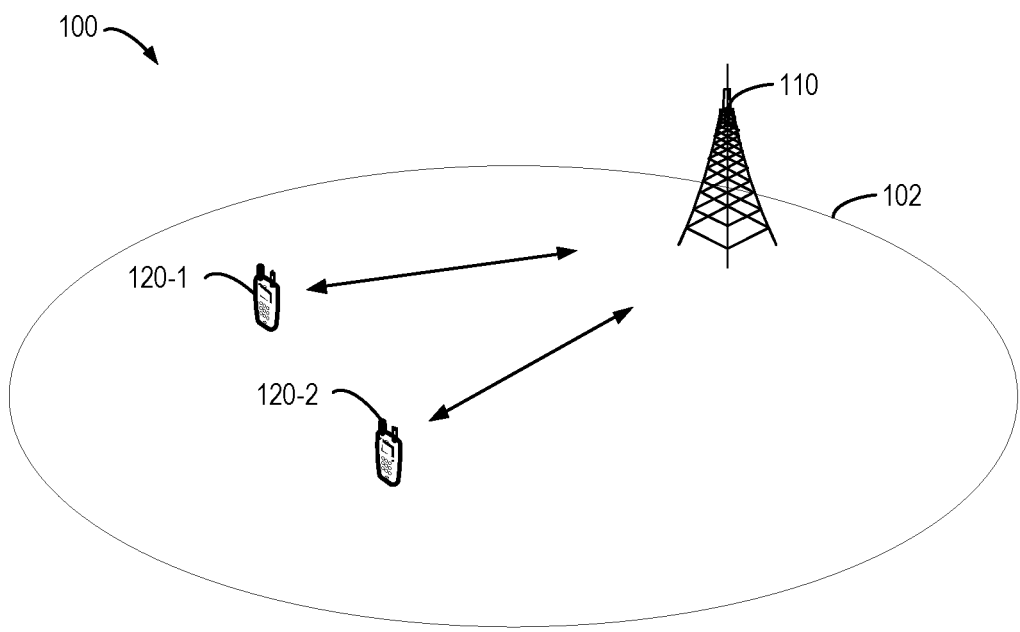
FIG. 1 is a schematic diagram of a communication environment in which some embodiments according to the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

FIG. 1 shows an example communication network 100 in which embodiments of the present disclosure can be implemented. The network 100 includes a network device 110, a terminal device 120-1 and a terminal device 120-2 (hereinafter collectively referred to as a terminal device 120) served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 110.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In the network 100, communications between the network device 110 and the terminal device 120 may be based on unlicensed band, and more particularly, based on unlicensed wide frequency bands. Although not shown, there may be other communication technologies in the communication network, for example, Wireless-Fidelity (Wi-Fi), LTE-Licensed-Assisted Access (LTE-LAA), which share the same unlicensed band.

As mentioned above, there are some remaining issues regarding communication on unlicensed band. For NR and LTE systems, as the intention for operation is on licensed band, frame structure based access is adopted. As a result, the network device and the terminal device should perform transmission on symbol boundary for example. However, due to Listen Before Talk (LBT), especially for Channel Occupation Time (COT) sharing scenario, where the network device initializes a transmission and the terminal device response to the network device using a one-shot (e.g. 25 μs interval for Channel Clear Access (CCA)), the terminal device has to start transmitting after the end of the network device's transmission with 25 μs. If the network device stops at symbol boundary, the terminal device will not transmit at symbol boundary any more. In LTE-LAA, Cyclic Prefix (CP) extension to extend the CP such that the terminal device starts transmission at 25 μs after the network device's transmission is adopted.

Moreover, in addition to grant based UL transmission, for example a dynamically scheduled physical uplink shared channel (PUSCH) transmission, configured grant (CG) based UL transmission has been agreed to be supported in new radio unlicensed (NR-U). With the CG mechanism, the NR system enables multiple terminal devices to share periodic resources allocated. The network device allocates the configured grant resources to multiple terminal devices, and the terminal devices randomly utilize the resources when they have data to transmit. The terminal device which has data to transmit may randomly select a point in time to occupy the unlicensed band. However, this randomly selected point may be not located at symbol boundary. In such a situation, in order to occupy the unlicensed band, transmission should be extended from the next symbol boundary to this randomly selected point. In other words, the time interval between this randomly selected point and the next symbol boundary should be utilized by the terminal device to transmit signal.

CP extension has been adopted in LTE-LAA and can allow the terminal device starting to transmit at arbitrary point. In LTE-LAA, the network device may indicate the start point to the terminal device via downlink control information (DCI) but the behavior of the terminal device when the start point is after the second slot boundary is undefined. Meanwhile, the parameter 't' in time domain defined in LTE is 0 from starting of each OFDM symbol, while it is 0 from starting of each subframe in NR. Due to this difference between LTE and NR, the approach for CP extension in LTE-LAA cannot be directly applied to NRU. Additionally, in NR, the starting OFDM symbol can be indicated in DCI for uplink grant, and the network device can ensure the start point is not after starting symbol boundary of the terminal device.

CP extension for grant based transmission in NR has been discussed. For example, for the CP extension prior to at least a dynamically scheduled physical uplink shared channel (PUSCH) transmission, the CP extension is located in the symbol(s) immediately preceding the PUSCH allocation indicated by start and length indication value (SLIV). The supported durations for CP extension at the terminal device are based on subcarrier spacing, symbol length and optionally timing advance, etc.

However, CP extension in the case of CG based UL transmission has not be addressed and the duration of CP extension according to some proposal is limited to one OFDM symbol. Therefore, a unified and flexible CP extension which takes into account OFDM baseband signal generation and start symbol indicated by UL grant is desired for communication in NRU.

Some example embodiments of the present disclosure provide a solution for CP extension. The solution for CP extension disclosed herein utilizes the characteristic of OFDM baseband signal generation in NR to start from each subframe, which is different from LTE. Due to the difference, the signal generation will also be different for CP extension to fulfill the characteristic of NR.

According to the solution, signal generation for the CP extension of a symbol l is performed based on signal generation for the symbol l, for example by extending the time range of the signal generation for the symbol l. In this way, unified CP extension can be achieved without any change or modification to the generated signal of the symbol l. In other words, in case of CP extension of the first OFDM symbol l allocated for UL transmission (e.g. PUSCH transmission), the time-continuous signal for the interval $t_{start,l}^{\mu} - T_{ext} \leq t < t_{start,l}^{\mu}$ preceding the first OFDM symbol l for UL transmission is given by:

$$s_{ext}^{(p,\mu)}(t) = s_l^{(p,\mu)}(t) \quad (1)$$

$$t_{start,l}^{\mu} - T_{ext} \leq t < t_{start,l}^{\mu} \quad (2)$$

where l represents the start OFDM symbol allocated for UL transmission, t represents the parameter for time which starts from each subframe, μ represents the subcarrier spacing configuration, $t_{start,l}^{\mu}$ represents the starting time instant of the start OFDM symbol l and $T_{ext}$ represents the duration of the CP extension.

Equation (1) relates to OFDM baseband signal generation for all channels except physical random access channel (PRACH). The item $s_l^{(p,\mu)}(t)$ as shown in equation (1) represents the time-continuous signal on antenna port p and subcarrier spacing configuration μ for OFDM symbol l in a subframe for any physical channel or signal except PRACH. The item $s_{ext}^{(p,\mu)}(t)$ as shown in equation (1) represents the time-continuous signal on antenna port p and subcarrier spacing configuration μ for the CP extension preceding the OFDM symbol l. As can be seen from equation (1), signal generation for the start OFDM symbol l and signal generation for CP extension are based on the same function but with different ranges of time t.

The start OFDM symbol l for UL transmission may be the start OFDM symbol indicated by UL grant in DCI (for example in the case of grant based transmission) or the start OFDM symbol indicated by configured grant (for example in the case of CG based transmission). If t<0, it means the previous subframe before the current subframe where the OFDM symbol l is located in.

This solution enables unified CP extension including flexible extension length for both grant based extension and CG random extension. In this way, both grant based extension and CG based extension can be supported in NR and how to generate OFDM baseband signal for NRU is also specified.

Figure 2:
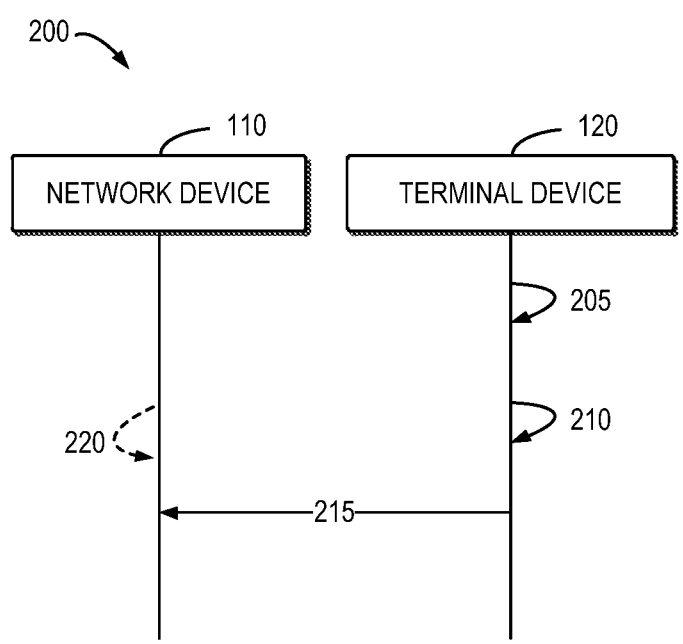
FIG. 2 is a schematic diagram illustrating an example process in accordance with some embodiments of the present disclosure.

To better understand the above solution for CP extension, an example process is now described with reference to FIG. 2, which is a schematic diagram illustrating an example process 200 in accordance with some embodiments of the present disclosure. As shown in FIG. 2, the example process 200 may involve the network device 110 and the terminal device 120. It is to be understood that the process 200 may include additional acts not shown and/or may omit some acts as shown, and the scope of the present disclosure is not limited in this regard.

As shown in FIG. 2, the terminal device 120 determines 205 a time interval preceding a start symbol for uplink transmission. For example, an OFDM symbol l may be allocated as the start symbol for uplink transmission based on UL grant or CG as mentioned above. The uplink transmission may be PUCCH transmission or PUSCH transmission.

Figure 3:
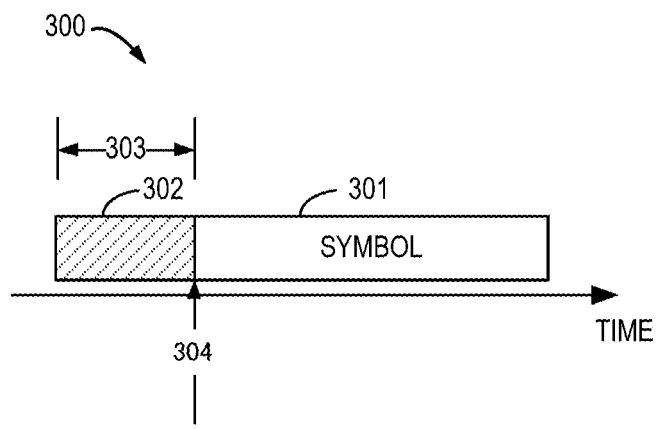
FIG. 3 shows a schematic diagram illustrating an example of extension from a start symbol according to some embodiments of the present disclosure.

Now reference is made to FIG. 3, which shows a schematic diagram 300 illustrating an example of extension from a start symbol according to some embodiments of the present disclosure. As shown in FIG. 3, the prefix 302 extending from the start symbol 301 spans the time interval 303 preceding the start symbol 301. The time interval 303 may be represented as $[t_{start,l}^{\mu} - T_{ext}, t_{start,l}^{\mu}]$ similar as the above equation (2). As such, $t_{start,l}^{\mu}$ may correspond to the starting time instant 304 of the start symbol 301 and $T_{ext}$ may correspond to the length of the time interval 303 or in other words the length of the prefix 302. The terminal device 120 may determine the time interval 303 based on the length of the prefix 302 and the starting time instant 304 of the start symbol 301. The terms "the length of the time interval", "the length of the prefix" and $T_{ext}$ may be used exchangeably herein.

The CP extension purpose for CG random extension is different from uplink grant case. For uplink grant, the CP extension is for COT sharing of the network device 110 or the terminal device 120. While for CG case, random CP extension is for terminal device multiplexing under LBT, i.e. the network device 110 can configure multiple terminal devices on the same frequency time resource, and only the terminal device succeeding in LBT can transmit on that resource. Therefore, obtaining of the value of $T_{ext}$ may be different for the cases of UL grant based transmission and CG based transmission.

In some example embodiments where the uplink transmission is based on UL grant from the network device 110, the length of the prefix 302 or the value of $T_{ext}$ may be determined based on subcarrier spacing, symbol length and optionally timing advance, etc. For example, for μ=0, $T_{ext}$ may be equal to one of $T_{symb,l}^{\mu} - 25 \cdot 10^{-6}$, $C_2 T_{symb,l}^{\mu} - 16 \cdot 10^{-6} - T_{TA}$, and $C_3 T_{symb,l}^{\mu} - 25 \cdot 10^{-6} - T_{TA}$, where $C_2$ and $C_3$ depends on subcarrier spacing and $T_{symb,l}^{\mu}$ represents symbol length.

In some example embodiments where the uplink transmission is based on configured grant from the network device 110, the length of the prefix 302 or the value of $T_{ext}$ may be determined based on whether the uplink transmission is beyond a maximum channel occupation time (MCOT) obtained by the network device 110. If the uplink transmission is beyond the MCOT, the terminal device 120 may determine the length of the time interval 303 or the value of $T_{ext}$ based on a value from a first set of values. If the uplink transmission is within the MCOT, the terminal device 120 may determine the length of the time interval 303 or the value of $T_{ext}$ based on a value from a second set of values. The number of values in the first set is greater than the number of values in the second set.

As an example, for CG based transmission with random CP extension, $T_{ext}$ may be determined as $9 \cdot 10^{-6} \cdot n$ seconds, where n is a randomly select integer value. If the CG based transmission is outside of the MCOT obtained by the network device 110, 0≤n≤6. That is, n can be selected from a set of values {0, 1, 2, 3, 4, 5 and 6}. If the CG based transmission is inside of the MCOT obtained by the network device 110, 0≤n≤5. That is, n can be selected from a set of values {0, 1, 2, 3, 4 and 5}.

Still referring to FIG. 2, the terminal device 120 determines 210, based on a first signal generating operation for the start symbol 301, a second signal generating operation for the time interval 303. The terminal device 120 may determine 210 the second signal generating operation for the time interval 303 based on the first signal generating operation for the start symbol 301. In some example embodiments, the first and second signal generating operations may be based on the same function but with different operating ranges. In some example embodiments, the second signal generating operation for the time interval 303 may be determined by extending an operating range of the first signal generating operation for the start symbol 301.

For example, the first signal generation for the start symbol may correspond to the function or item $s_l^{(p,\mu)}(t)$ as shown in the above equation (1), while the second signal generating operation for the time interval 303 or for the extension may correspond to the function or item $s_{ext}^{(p,\mu)}(t)$ as shown in the above equation (1). By extending the range of time t from the start symbol 301 to the timer interval 303 for CP extension, no change or modification is made to the signal generation of the symbol l, which is required for CP extension in LTE.

The terminal device 120 transmits 215 a signal to the network device 110 over the time interval 303. The transmitted signal is generated based on the second signal generating operation. For example, the signal transmitted over the time interval 303 or in other word the signal for the CP extension may be generated based on the above equation (1). As a result, the terminal device 120 may occupy a channel between the network device 110 and the terminal device 120, for example may occupy the unlicensed band.

In this way, unified CP extension is achieved. The unified CP extension can allow extension of more than one OFDM symbols while conventional extension only limit the extension within one OFDM symbol.

In some example embodiments, to perform the uplink transmission, the terminal device 120 may generate a further signal for the uplink transmission based on the first signal generating operation and transmits the further signal to the network device 110 over the start symbol 301. For example, the terminal device 120 may perform the OFDM baseband signal generation based on the item $s_l^{(p,\mu)}(t)$ as shown in equation (1).

The signal transmitted by the terminal device 120 for the CP extension, for example over the time interval 303 may be or may not be utilized by the network device 110. In some example embodiments, the network device 110 may ignore the signal transmitted by the terminal device 120 for the CP extension.

In some example embodiments, the network device 110 may utilize the signal transmitted by the terminal device 120 for the CP extension. For example, the network device 110 may determine 220 the time interval 303 for the CP extension, for example in a similar way as described above with respect to the terminal device 120. Then, the network device 110 may receive, from the terminal device 120 over the time interval 303, the signal generated based on the above equation (1) for example.

In the above, some example embodiments are described to illustrate CP extension. In NRU, enhanced Hybrid Automatic Repeat reQuest Acknowledgement (HARQ-ACK) codebook has been proposed. For enhanced HARQ-ACK codebook with single or multiple configured DL cells, it has been agreed that total downlink assignment index (T-DAI) is indicated to the terminal device in non-fallback DCI scheduling PDSCH for the scheduled PDSCH group if more than one DL cell is configured. If only one DL cell is configured, no T-DAI is indicated to terminal device for the scheduled PDSCH group. Meanwhile, whether T-DAI is indicated in non-fallback DCI for the non-scheduled PDSCH group with single or multiple configured DL cells can be configured by RRC.

For enhanced HARQ-ACK codebook, two PDSCH groups are introduced. HARQ-ACK sub-codebook is generated for each of the two PDSCH groups and meanwhile the HARQ-ACK sub-codebooks for the two PDSCH groups can be transmitted in the same PUCCH. In such a situation, the two HARQ-ACK sub-codebooks are mapped into one HARQ-ACK codebook. Therefore, how to place the two HARQ-ACK sub-codebooks in the HARQ-ACK codebook needs to be specified.

According to some conventional solutions proposed previously, when HARQ-ACK feedback for more than one PDSCH group exists for a PUCCH transmission occasion, the feedback for PDSCH group #1 is appended to the feedback for PDSCH group #0. In other words, the HARQ-ACK sub-codebook for PDSCH group #1 is appended after the HARQ-ACK sub-codebook for PDSCH group #0.

However, there may be sub-codebook shift issue for such conventional solutions. For example, if PDSCH group #0 is the scheduled group and there is no T-DAI for this group, the miss detection of the last DCI for that group will not be aware by the terminal device and thus HARQ-ACK bits for group #1 will be shifted forward in this case. To better understand the sub-codebook shift issue, reference is now made to FIG. 4, which shows a schematic diagram 400 illustrating sub-codebook shift issue for enhanced HARQ-ACK codebook.

Figure 4:
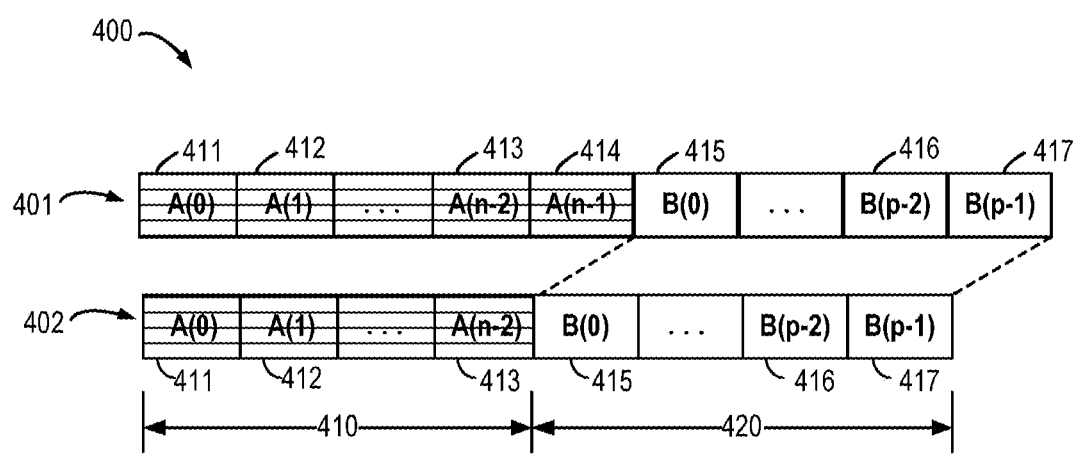
FIG. 4 shows a schematic diagram illustrating sub-codebook shift issue.

It is assumed that group A as shown in FIG. 4 represents PDSCH group #0 and is the scheduled group with n PDSCHs to feedback and group B as shown in FIG. 4 represents PDSCH group #1 and is the non-scheduled group with p PDSCHs to feedback. It is further assumed that only one DL cell is configured and thus no T-DAI for the scheduled group is indicated to the terminal device.

The codebook 401 schematically shows the HARQ-ACK codebook as expected by the network device. HARQ-ACK feedbacks 411-414 correspond to n PDSCHs in group A and constitute the HARQ-ACK sub-codebook for group A as expected by the network device. HARQ-ACK feedbacks 415-417 correspond to p PDSCHs in group B and constitute the HARQ-ACK sub-codebook for group B as expected by the network device.

There may be a case where at least the last PDCCH for group A is incorrectly detected, or in other words, the DCI scheduling the last PDSCH of group A is incorrectly received or not received. The codebook 402 schematically shows the HARQ-ACK codebook which would be transmitted by the terminal device based on the conventional solution. HARQ-ACK feedbacks 411-413 correspond to (n−1) PDSCHs in group A and constitute the HARQ-ACK sub-codebook 410 for group A as transmitted by the terminal device. Since the last PDCCH of group A is incorrectly detected and no T-DAI for group A is indicated to the terminal device, the HARQ-ACK feedback 414 for the last PDSCH of group A (which is otherwise included in the expected codebook 401) is absent in the codebook 402. In the case as shown in FIG. 4, the last PDCCH for group B is correctly detected. As such, HARQ-ACK feedbacks 415-

417 correspond to p PDSCHs in group B and constitute the HARQ-ACK sub-codebook 420 for group B transmitted by the terminal device.

As can be seen from FIG. 4, after receiving the codebook 402, the network device would incorrectly interpret the HARQ-ACK feedback 415 for the first PDSCH of group B as the expected HARQ-ACK feedback for the last PDSCH of group A and so on. As a result, the sub-codebook shift issue occurs in the conventional mapping solution as described above. Therefore, it is desired to have a solution which can solve the sub-codebook shift issue.

Some example embodiments of the present disclosure provide a solution for generating HARQ-ACK codebook. According to the solution, in the case where the HARQ-ACK information for two PDSCH groups is feedback in one PUCCH transmission occasion corresponding to a particular PDSCH group of the two PDSCH groups, the HARQ-ACK information for the particular PDSCH group is appended after the HARQ-ACK information for the other PDSCH group. In other words, when the HARQ-ACK information for two PDSCH groups is feedback in one PUCCH transmission occasion, the HARQ-ACK information for the scheduled PDSCH group is appended after the HARQ-ACK information for the non-scheduled PDSCH group.

According to the solution of the present disclosure, the mapping order for the scheduled group and non-scheduled group can overcome sub-codebook shift issue due to miss detection of the last DCI for one group. For example, in the case where a single DL cell is configured, as T-DAI can be configured for the non-scheduled group but there is no T-DAI for the scheduled group, the proposed mapping order of different PDSCH groups can solve the sub codebook shift issue.

Figure 5:
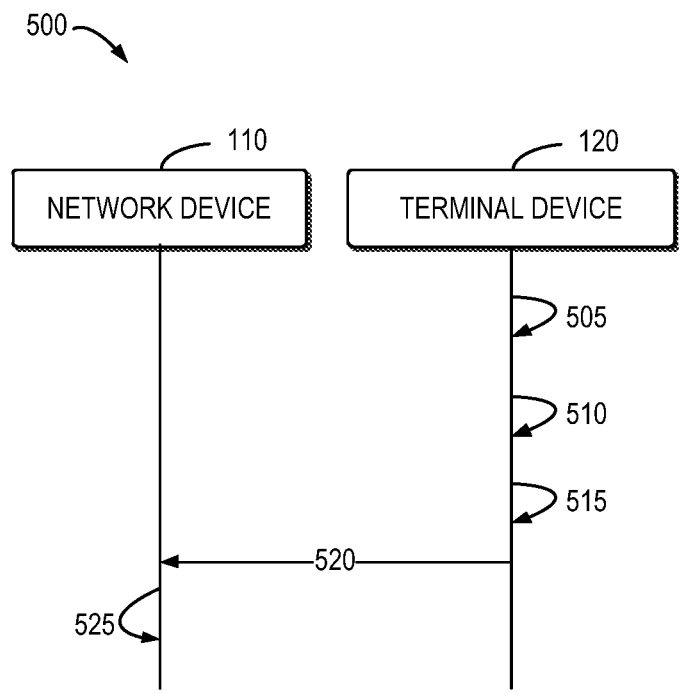
FIG. 5 is a schematic diagram illustrating an example process in accordance with some embodiments of the present disclosure.

To better understand the above solution for generating HARQ-ACK codebook, an example process is now described with reference to FIG. 5, which is a schematic diagram illustrating an example process 500 in accordance with some embodiments of the present disclosure. As shown in FIG. 5, the example process 500 may involve the network device 110 and the terminal device 120. It is to be understood that the process 500 may include additional acts not shown and/or may omit some acts as shown, and the scope of the present disclosure is not limited in this regard.

Although not shown, the network device 110 may indicate the terminal device 120 to include HARQ-ACK information concerning two PDSCH groups in one PUCCH transmission occasion. Which PDSCH group a particular PDSCH belongs to may be indicated in the corresponding DCI scheduling the particular PDSCH. As shown in FIG. 5, the terminal device 120 determines 505 first feedback information concerning reception of data on a first group of shared channels between the terminal device 120 and a network device 110. For example, the terminal device 120 may determine the HARQ-ACK information for the first PDSCH group based on the reception of data on the PDSCHs of the first PDSCH group. The HARQ-ACK information for the first PDSCH group may be implemented as HARQ-ACK sub-codebook for the first PDSCH group.

The terminal device 120 determines 510 second feedback information concerning reception of data on a second group of shared channels between the terminal device 120 and the network device 110. The second group of shared channels are different from the first group of shared channels. For example, the terminal device 120 may determine the HARQ-ACK information for the second PDSCH group based on the reception of data on the PDSCHs of the second PDSCH group. The HARQ-ACK information for the second PDSCH group may be implemented as HARQ-ACK sub-codebook for the second PDSCH group.

In some example embodiments, the terminal device 120 may determine the number of shared channels in the second group based on DCI from the network device 110 and determine the second feedback information based on the determined number and reception of data on shared channels in the second group. For example, the terminal device 120 may determine the total number of PDSCHs in the second PDSCH group based on T-DAI included in DCI and generate the HARQ-ACK sub-codebook for the second PDSCH group based on the total number and reception of each PDSCH in the second PDSCH group.

The terminal device 120 then generates 515 uplink control information (UCI) for the first group of shared channels by appending the first feedback information after the second feedback information. In such a case, the first group of shared channels is the scheduled group while the second group of shared channels is the non-scheduled group.

Continuing with the above example, in such a case, the first PDSCH group can be considered as the scheduled group while the second PDSCH group can be considered as the non-scheduled group. The terminal device 120 may generate the UCI corresponding to the first PDSCH group by appending the HARQ-ACK information for the first PDSCH group after the HARQ-ACK information for the second PDSCH group. For example, the HARQ-ACK sub-codebook for the first PDSCH group is appended after the HARQ-ACK sub-codebook for the second PDSCH group. That is, the HARQ-ACK information for the scheduled PDSCH group is appended to the HARQ-ACK information for the non-scheduled PDSCH group.

The terminal device 120 transmits 520 the UCI to the network device 110. The UCI may be transmitted in one PUCCH transmission occasion corresponding to the first PDSCH group. As an example, if the terminal device 120 is indicated to include the HARQ-ACK information for two PDSCH groups in the same PUCCH, the terminal device 120 may append the HARQ-ACK information for group g PDSCH receptions after the HARQ-ACK information for group (g+1)mod 2 PDSCH receptions in PUCCH transmission occasion i(g).

After receiving the UCI from the terminal device 120, the network device 110 determines 525, based on the uplink control information, the first feedback information concerning reception of data on the first group of shared channels and second feedback information concerning reception of data on the second group of shared channels. For example, the network device 110 may determine the HARQ-ACK information for the first PDSCH group and the HARQ-ACK information for the second PDSCH group.

It is to be noted that the first PDSCH group as described with reference to FIG. 5 may be any one of the PDSCH group #0 and PDSCH group #1 as mentioned above and the second PDSCH may be the other one of the PDSCH group #0 and PDSCH group #1 accordingly.

Figure 6:
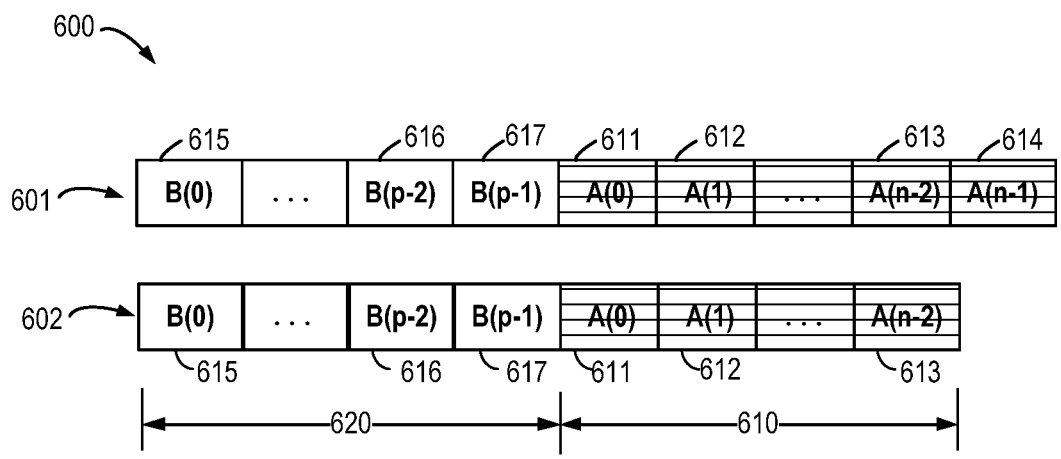
FIG. 6 shows a schematic diagram illustrating an example of enhanced feedback information according to some embodiments of the present disclosure.

Reference is now made to FIG. 6, which shows a schematic diagram illustrating an example of enhanced feedback information according to some embodiments of the present disclosure. Similar assumptions as those for FIG. 4 applies to FIG. 6. It is assumed that group A as shown in FIG. 6 represents PDSCH group #0 and is the scheduled group with n PDSCHs to feedback and group B as shown in FIG. 6 represents PDSCH group #1 and is the non-scheduled group with p PDSCHs to feedback. It is further assumed that only one DL cell is configured and thus no T-DAI for the scheduled group (group A here) is indicated to the terminal device 120.

The codebook 601 schematically shows the HARQ-ACK codebook as expected by the network device 110. HARQ-ACK feedbacks 611-614 correspond to n PDSCHs in group A and constitute the HARQ-ACK sub-codebook for group A as expected by the network device 110. HARQ-ACK feedbacks 615-617 correspond to p PDSCHs in group B and constitute the HARQ-ACK sub-codebook for group B as expected by the network device 110.

There may be a case where the last PDCCH for both group A and group B is incorrectly detected as described above with reference to FIG. 4. The codebook 602 schematically shows the HARQ-ACK codebook which is transmitted by the terminal device 120 according to the example embodiments of the present disclosure. HARQ-ACK feedbacks 611-613 correspond to (n−1) PDSCHs in group A and constitute the HARQ-ACK sub-codebook 610 for group A as transmitted by the terminal device 120. Since the last PDCCH of group A is incorrectly detected and no T-DAI for group A is indicated to the terminal device 120, the HARQ-ACK feedback 614 for the last PDSCH of group A (which is otherwise included in the expected codebook 601) is absent in the codebook 602.

Although the last PDCCH for group B is incorrectly detected, since T-DAI for group B can be indicated to the terminal device 120 (for example, as configured by RRC), the terminal device 120 may be aware that there should be p PDSCHs in the group B and the number of HARQ-ACK feedback for group B should be p. As such, the HARQ-ACK feedback 617 for the last PDSCH of group B is present in the codebook 602. HARQ-ACK feedbacks 615-617 correspond to p PDSCHs in group B and constitute the HARQ-ACK sub-codebook 620 for group B transmitted by the terminal device 120.

Compared to FIG. 4, the sub-codebook shift issue does not occur in the example of FIG. 6. The sub-codebook shift issue as shown in FIG. 4 can be solved by the above solution for generating HARQ-ACK codebook as proposed herein.

Figure 7:
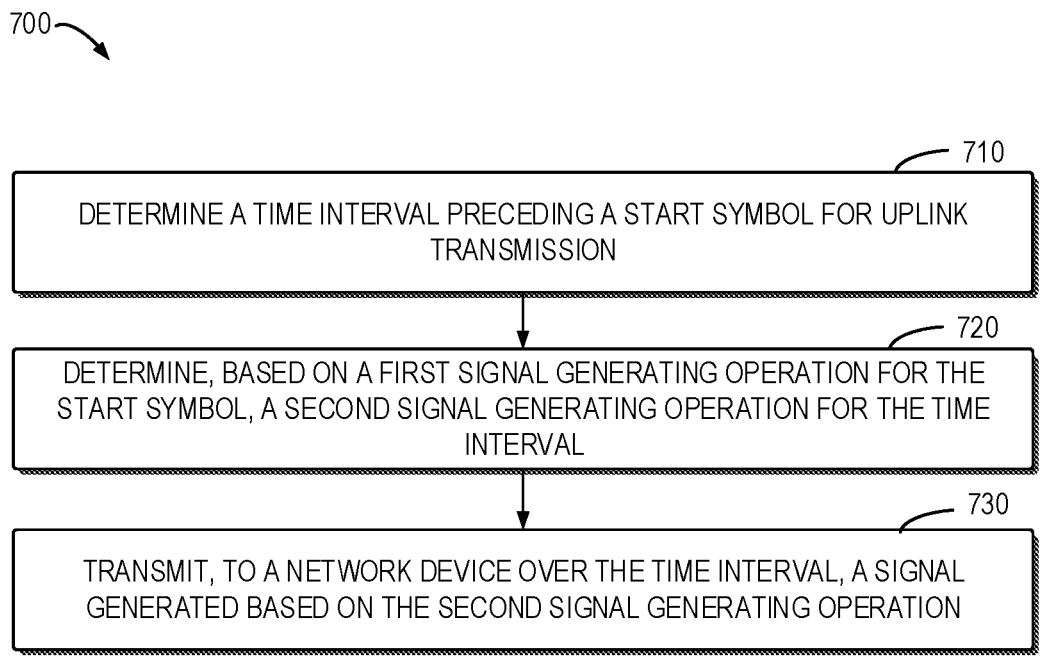
FIG. 7 illustrates an example method in accordance with some embodiments of the present disclosure.

FIG. 7 illustrates a flowchart of an example method 700 according to some embodiments of the present disclosure. The method 700 can be implemented at the terminal device 120 as shown in FIG. 1. It is to be understood that the method 700 may include additional blocks not shown and/or may omit some blocks as shown, and the scope of the present disclosure is not limited in this regard. For the purpose of discussion, the method 700 will be described from the perspective of the terminal device 120 with reference to FIG. 1.

At block 710, the terminal device 120 determines a time interval preceding a start symbol for uplink transmission. At block 720, the terminal device 120 determines, based on a first signal generating operation for the start symbol, a second signal generating operation for the time interval. At block 730, the terminal device 120 transmits, to a network device 110 over the time interval, a signal generated based on the second signal generating operation.

In some example embodiments, determining the second signal generating operation comprises: determining the second signal generating operation by extending an operating range of the first signal generating operation, or determining the second signal generating operation such that the second signal generating operation has a different operating range from the first signal generating operation.

In some example embodiments, determining the time interval comprises: obtaining a length of the time interval; and determining the time interval based on the length of the time interval and a starting time instant of the start symbol.

In some example embodiments, the uplink transmission is based on configured grant from the network device 110 and obtaining the length of the time interval comprises: determining whether the uplink transmission is beyond a maximum channel occupation time obtained by the network device 110; in accordance with a determination that the uplink transmission is beyond the maximum channel occupation time, determining the length of the time interval based on a value from a first set of values; and in accordance with a determination that the uplink transmission is within the maximum channel occupation time, determining the length of the time interval based on a value from a second set of values, the number of values in the first set greater than the number of values in the second set.

In some example embodiments, the signal corresponds to a prefix extended from the start symbol.

In some example embodiments, transmitting the signal comprises: transmitting the signal on an unlicensed band.

In some example embodiments, the method 700 further comprises: generating a further signal for the uplink transmission based on the first signal generating operation; and transmitting the further signal to the network device 110 over the start symbol.

Figure 8:
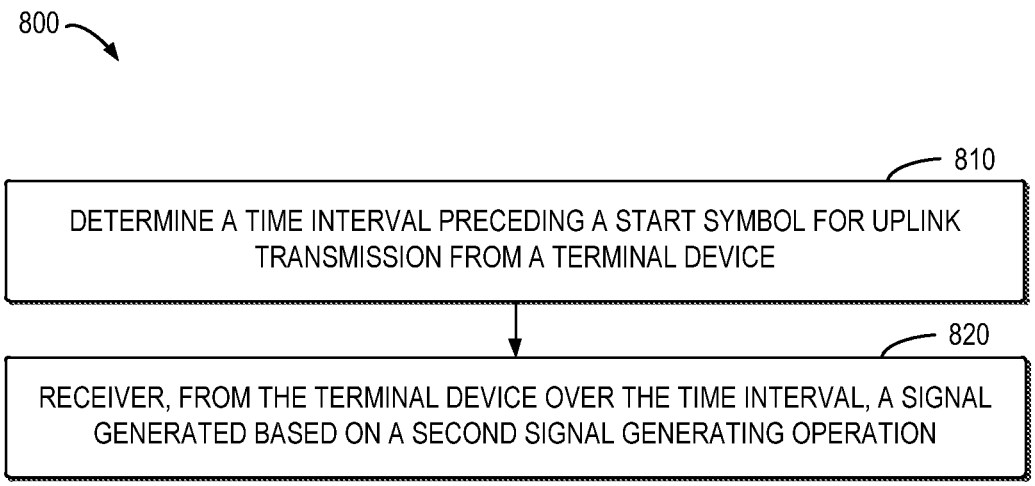
FIG. 8 illustrates an example method in accordance with some embodiments of the present disclosure.

FIG. 8 illustrates a flowchart of an example method 800 according to some embodiments of the present disclosure. The method 800 can be implemented at the network device 110 as shown in FIG. 1. It is to be understood that the method 800 may include additional blocks not shown and/or may omit some blocks as shown, and the scope of the present disclosure is not limited in this regard. For the purpose of discussion, the method 800 will be described from the perspective of the network device 110 with reference to FIG. 1.

At block 810, the network device 110 determines a time interval preceding a start symbol for uplink transmission from a terminal device 120. At block 820, the network device 110 receives, from the terminal device 120 over the time interval, a signal generated based on a second signal generating operation for the time interval. The second signal generating operation is determined based on a first signal generating operation for the start symbol.

Figure 9:
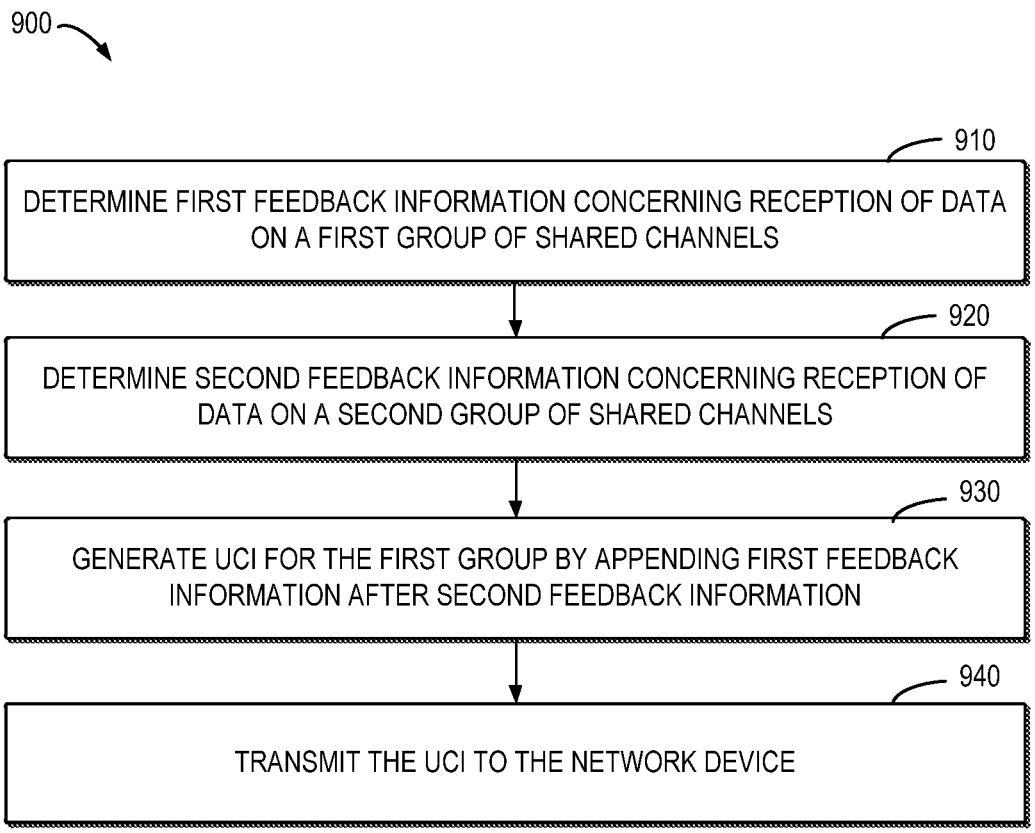
FIG. 9 illustrates an example method in accordance with some embodiments of the present disclosure.

FIG. 9 illustrates a flowchart of an example method 900 according to some embodiments of the present disclosure. The method 900 can be implemented at the terminal device 120 as shown in FIG. 1. It is to be understood that the method 900 may include additional blocks not shown and/or may omit some blocks as shown, and the scope of the present disclosure is not limited in this regard. For the purpose of discussion, the method 900 will be described from the perspective of the terminal device 120 with reference to FIG. 1.

At block 910, the terminal device 120 determines first feedback information concerning reception of data on a first group of shared channels between the terminal device 120 and a network device 110. At block 920, the terminal device 120 determines second feedback information concerning reception of data on a second group of shared channels between the terminal device 120 and the network device 110, the second group of shared channels different from the first group of shared channels. At block 930, the terminal device 120 generates uplink control information for the first group by appending the first feedback information after the second feedback information. At block 940, the terminal device 120 transmits the uplink control information to the network device 110.

In some example embodiments, determining the second feedback information comprises: determining the number of shared channels in the second group based on downlink control information from the network device 110; and determining the second feedback information based on the determined number and reception of data on shared channels in the second group.

In some example embodiments, transmitting the uplink control information comprises: transmitting the uplink control information on an unlicensed band.

Figure 10:
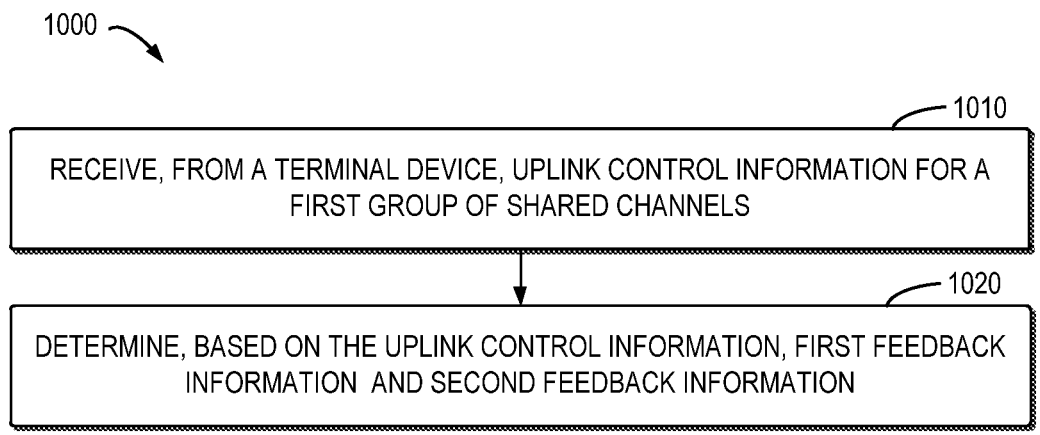
FIG. 10 illustrates an example method in accordance with some embodiments of the present disclosure.

FIG. 10 illustrates a flowchart of an example method 1000 according to some embodiments of the present disclosure. The method 1000 can be implemented at the network device 110 as shown in FIG. 1. It is to be understood that the method 1000 may include additional blocks not shown and/or may omit some blocks as shown, and the scope of the present disclosure is not limited in this regard. For the purpose of discussion, the method 1000 will be described from the perspective of the network device 110 with reference to FIG. 1.

At block 1010, the network device 110 receives, from a terminal device 120, uplink control information for a first group of shared channels between the network device 110 and the terminal device 120. At block 1020, the network device 110 determines, based on the uplink control information, first feedback information concerning reception of data on the first group of shared channels and second feedback information concerning reception of data on a second group of shared channels between the network device 110 and the terminal device 120. The second group of shared channels are different from the first group of shared channels, and the first feedback information is appended after the second feedback information in the uplink control information.

In some example embodiments, receiving the uplink control information comprises: receiving the uplink control information on an unlicensed band.

Figure 11:
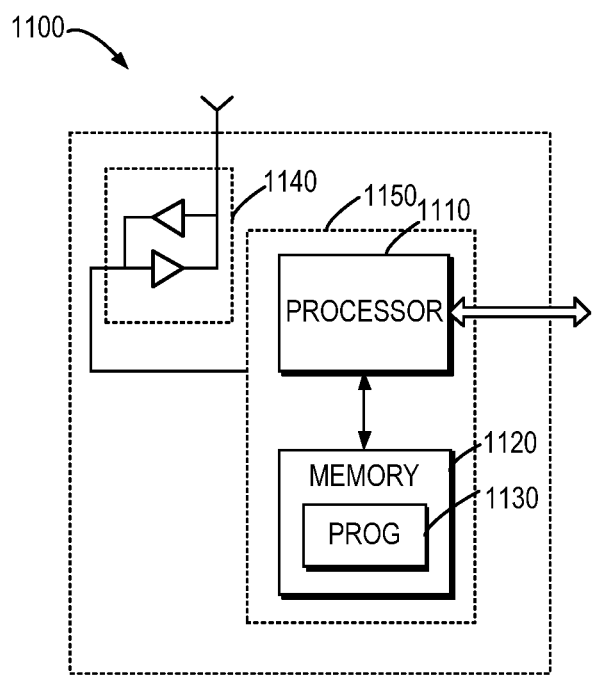
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of the network device 110 or the terminal device 120 as shown in FIG. 1. Accordingly, the device 1100 can be implemented at or as at least a part of the network device 110 or the terminal device 120.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, Si interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 7-10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1110 may form processing means 1150 adapted to implement various embodiments of the present disclosure.

The memory 1110 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1110 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 7-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication performed by a terminal device, the method comprising:
    transmitting, to a network device, a second signal $s_{ext}^{(p,\mu)}(t)$ during a time interval $t_{start,l}^{\mu}-T_{ext} \leq t < t_{start,l}^{\mu}$ preceding a first symbol l allocated for an uplink transmission, wherein,
    the second signal $s_{ext}^{(p,\mu)}(t)$ is for cyclic prefix extension of the first symbol l,
    $t_{start,l}^{\mu}$ represents a starting position of the first symbol l for subcarrier spacing configuration $\mu$,
    t=0 at a start of a subframe where the first symbol l is located, and
    $T_{ext}$ is a duration of time, for the cyclic prefix extension, preceding the starting position of the first symbol l; and
    transmitting, to a network device, a first signal $s_l^{(p,\mu)}(t)$ in the first symbol l, wherein the first signal $s_l^{(p,\mu)}(t)$ is a time-continuous signal on antenna port p and the subcarrier spacing configuration $\mu$ for the first symbol l in the subframe, and wherein $s_{ext}^{(p,\mu)}(t)=s_l^{(p,\mu)}(t)$.

2. The method of claim 1, wherein t<0 refers to a signal in a subframe previous to the subframe where the first symbol l is located.

3. The method of claim 1, wherein the first symbol l is for any physical channel except PRACH (Physical random-access channel).

4. The method of claim 1, further comprising:
    receiving, from the network device, Downlink Control Information (DCI) indicating the first symbol l.

5. A method for communication performed by a network device, the method comprising:
    receiving, from a terminal device, a second signal during a time interval $t_{start,l}^{\mu}-T_{ext} \leq t < t_{start,l}^{\mu}$ preceding a first symbol l allocated for an uplink reception, wherein,
    the second signal $s_{ext}^{(p,\mu)}(t)$ is for cyclic prefix extension of the first symbol l,
    $t_{start,l}^{\mu}$ represents a starting position of the first symbol l for subcarrier spacing configuration $\mu$,
    t=0 at a start of a subframe where the first symbol l is located, and
    $T_{ext}$ is a duration of time, for the cyclic prefix extension, preceding the starting position of the first symbol l; and
    receiving, from the terminal device, a first signal $s_l^{(p,\mu)}(t)$ in the first symbol l, wherein the first signal $s_l^{(p,\mu)}(t)$ is a time-continuous signal on antenna port p and the subcarrier spacing configuration $\mu$ for the first symbol l in the subframe, and $s_{ext}^{(p,\mu)}(t)=s_l^{(p,\mu)}(t)$.

6. The method of claim 5, wherein t<0 refers to a signal in a subframe previous to the subframe where the first symbol l is located.

7. The method of claim 5, wherein the first symbol l is for any physical channel except PRACH (Physical random-access channel).

8. The method of claim 5, further comprising:
    transmitting, to the terminal device, Downlink Control Information (DCI) indicating the first symbol l.

9. A terminal device, comprising:
    a transceiver; and
    a processor,
    wherein the processor is configured to:
    determine a time interval $t_{start,l}^{\mu}-T_{ext} \leq t < t_{start,l}^{\mu}$ preceding a first symbol l allocated for an uplink transmission, wherein a second signal $s_{ext}^{(p,\mu)}(t)$ is for cyclic prefix extension of the first symbol l;
    $t_{start,l}^{\mu}$ represents a starting position of the first symbol l for subcarrier spacing configuration $\mu$,
    t=0 at a start of a subframe where the first symbol l is located, and
    $T_{ext}$ is a duration of time, for the cyclic prefix extension, preceding the starting position of the first symbol l; and
    transmit, to a network device, a first signal $s_l^{(p,\mu)}(t)$ in the first symbol l, wherein the first signal $s_l^{(p,\mu)}(t)$ is a time-continuous signal on antenna port p and the subcarrier spacing configuration $\mu$ for the first symbol l in the subframe, and wherein $s_{ext}^{(p,\mu)}(t)=s_l^{(p,\mu)}(t)$.

10. The terminal device of claim 9, wherein t<0 refers to a signal in a subframe previous to the subframe where the first symbol l is located.

11. The terminal device of claim 9, wherein the first symbol l is for any physical channel except PRACH (Physical random-access channel).

12. The terminal device of claim 9, wherein the processor is further configured to:
    receive, from the network device, Downlink Control Information (DCI) indicating the first symbol l.

13. A network device, comprising:
a transceiver; and
a processor,
wherein the processor is configured to:
receive, from a terminal device, a second signal during a time interval $t_{start,l}^{\mu} - T_{ext} \leq t < t_{start,l}^{\mu}$ preceding a first symbol l allocated for an uplink reception, wherein,
the second signal $s_{ext}^{(p,\mu)}(t)$ is for cyclic prefix extension of the first symbol l,
$t_{start,l}^{\mu}$ represents a starting position of the first symbol l for subcarrier spacing configuration $\mu$,
- t=0 at a start of a subframe where the first symbol l is located, and
- $T_{ext}$ is a duration of time, for the cyclic prefix extension, preceding the starting position of the first symbol l; and
receive, from the terminal device, a first signal $s_l^{(p,\mu)}(t)$ in the first symbol l, wherein the first signal $s_l^{(p,\mu)}(t)$ is a time-continuous signal on antenna port p and the subcarrier spacing configuration $\mu$ for the first symbol l in the subframe, and wherein $s_{ext}^{(p,\mu)}(t) = s_l^{(p,\mu)}(t)$.

14. The network device of claim 13, wherein t<0 refers to a signal in a subframe previous to the subframe where the first symbol l is located.

15. The network device of claim 13, wherein the first symbol l is for any physical channel except PRACH (Physical random-access channel).

16. The network device of claim 13, wherein the processor is further configured to:
transmit, to the terminal device, Downlink Control Information (DCI) indicating the first symbol l.

* * * * *